United States Patent
Martin et al.

(10) Patent No.: US 8,628,603 B2
(45) Date of Patent: Jan. 14, 2014

(54) WATER-SAVING LIQUID-GAS CONDITIONING SYSTEM

(75) Inventors: Christopher L. Martin, Grand Forks, ND (US); Ye Zhuang, Grand Forks, ND (US)

(73) Assignee: Energy & Enviromental Research Center Foundation, Grand Forks, ND (US)

( * ) Notice: Subject to any disclaimer, the term of this patent is extended or adjusted under 35 U.S.C. 154(b) by 12 days.

(21) Appl. No.: 13/241,624

(22) Filed: Sep. 23, 2011

(65) Prior Publication Data

US 2013/0074693 A1   Mar. 28, 2013

(51) Int. Cl.
    *B01D 53/14* (2006.01)
(52) U.S. Cl.
    USPC ............ 95/188; 95/189; 95/195; 95/205; 95/206; 95/227; 95/230; 95/235; 96/234; 96/243; 96/257; 423/225; 423/243.08
(58) Field of Classification Search
    USPC .......... 95/192, 193; 96/46, 53, 200, 203, 270, 96/273, 277, 280, 297, 311
    See application file for complete search history.

(56) References Cited

U.S. PATENT DOCUMENTS

| | | | | |
|---|---|---|---|---|
| 3,959,441 A | * | 5/1976 | Furuta et al. ............... | 423/243.1 |
| 4,108,959 A | | 8/1978 | Tatani et al. | |
| 4,366,133 A | | 12/1982 | Rader et al. | |
| 4,964,885 A | * | 10/1990 | Wieser-Linhart ............. | 95/66 |
| 5,364,604 A | * | 11/1994 | Spink et al. ............. | 423/210 |
| 5,643,421 A | * | 7/1997 | Smith ............. | 203/12 |
| 6,156,102 A | * | 12/2000 | Conrad et al. ............. | 95/172 |
| 6,425,942 B1 | * | 7/2002 | Forster ............. | 95/174 |
| 6,843,835 B2 | * | 1/2005 | Fornai et al. ............. | 96/53 |
| 2002/0038552 A1 | * | 4/2002 | Maisotsenko et al. ........ | 62/121 |
| 2006/0191411 A1 | * | 8/2006 | Johnson ............. | 95/187 |
| 2008/0041228 A1 | * | 2/2008 | Seibert ............. | 95/166 |

FOREIGN PATENT DOCUMENTS

| | | |
|---|---|---|
| DE | 2939744 A1 | 4/1981 |
| DE | 102007005578 A1 | 8/2008 |
| EP | 2354710 A | 8/2011 |
| GB | 1445228 A | 8/1976 |

OTHER PUBLICATIONS

"International Application Serial No. PCT/US2012/056313, International Search Report mailed Jan. 2, 2013", 5 pgs.
"International Application Serial No. PCT/US2012/056313, Written Opinion mailed Jan. 2, 2013", 7 pgs.

* cited by examiner

*Primary Examiner* — Duane Smith
*Assistant Examiner* — Joubert X Glover
(74) *Attorney, Agent, or Firm* — Schwegman Lundberg & Woessner, P.A.

(57) ABSTRACT

A method for treating a process gas with a liquid comprises contacting a process gas with a hygroscopic working fluid in order to remove a constituent from the process gas. A system for treating a process gas with a liquid comprises a hygroscopic working fluid comprising a component adapted to absorb or react with a constituent of a process gas, and a liquid-gas contactor for contacting the working fluid and the process gas, wherein the constituent is removed from the process gas within the liquid-gas contactor.

22 Claims, 4 Drawing Sheets

WATER-SAVING LIQUID-GAS CONDITIONING SYSTEM

STATEMENT REGARDING FEDERALLY SPONSORED RESEARCH OR DEVELOPMENT

This invention was made with government support under Cooperative Agreement Number DE-FC26-08NT43291 awarded by the U.S. Department of Energy (DOE). The government has certain rights in the invention.

BACKGROUND ON THE INVENTION

Processing of gas streams, such as via mass or heat transfer from a process gas, is widely used in the chemical and power-production industries. For example, liquid-gas contactors are often used for purifying or removing constituents from process gas streams. One example of such a process is large scale flue gas desulfurization (FGD) that uses mass transfer between gas and liquid to absorb and neutralize $SO_2$ present in a flue gas. These systems are effective because of a relatively high interfacial surface area that can be generated and the relatively rapid kinetics associated with the chemistry of reactions occurring at the liquid-gas interface.

Liquid-gas contactors also consume a large amount of water, as moisture is continually lost via evaporation to the process gas stream unless and until the exhaust gas becomes water-saturated. Furthermore, these systems can produce large volumes of waste water that require treatment and disposal to manage the accumulation of soluble contaminants that may be absorbed in the liquid.

SUMMARY OF THE INVENTION

The present disclosure is generally directed to systems and methods that reduce water consumption of gas-conditioning systems such as liquid-gas contactors. The systems and methods of the present disclosure provide advantages for the surface area and kinetics of liquid-based gas conditioning while also reducing water consumption relative to art processes. Water savings may be achieved by reducing the amount of moisture that is lost to the process gas via evaporation that occurs when the process gas is at unsaturated conditions. The present disclosure is directed generally to contacting a process gas with a hygroscopic working fluid in order to remove a constituent from the process gas, wherein the hygroscopic working fluid may act as a liquid medium to support aqueous-phase absorption of the constituent from the process gas or to support chemical reaction of the constituent within a liquid-gas contactor.

In one example, the present disclosure is directed to a method for treating a process gas with a liquid, the method comprising contacting a process gas with a hygroscopic working fluid comprising a component adapted to absorb or react with a constituent of the process gas.

In another example, the present disclosure is directed to a method for treating a process gas with a liquid, the method comprising contacting a process gas with a hygroscopic working fluid in a liquid-gas contactor, the process gas comprising a constituent and the working fluid comprising a desiccant and a component adapted to absorb or react with the constituent of the process gas, wherein contacting the process gas with the working fluid removes the constituent from the process gas, then separating a reaction product from the working fluid after contacting the process gas with the hygroscopic working fluid, wherein the reaction product comprises at least one of the constituent of the process gas absorbed into the working fluid or a product of a reaction between the constituent of the process gas and a reagent within the working fluid, and then recirculating the working fluid back to the liquid-gas contactor after separating the reaction product from the working fluid.

In another example, the present disclosure is directed to a system for treating a process gas, the system comprising a hygroscopic working fluid comprising a component adapted to absorb or react with a constituent of a process gas, and a liquid-gas contactor for contacting the working fluid and the process gas, wherein the constituent is removed from the process gas within the liquid-gas contactor.

DETAILED DESCRIPTION OF THE INVENTION

The present disclosure is directed generally to systems and methods of using a hygroscopic working fluid as a liquid medium to support removal of a constituent from a process gas, such as via aqueous-phase absorption or reaction of the constituent by the hygroscopic working fluid within a liquid-gas contactor. Hygroscopic or desiccant-containing working fluids can rapidly achieve temperature and moisture equilibrium with the process gas, which can greatly reduce moisture evaporation into the process gas compared to the excessive moisture evaporation and quenching that is typical of predominantly water-based working fluids.

As described in more detail below, the hygroscopic working fluid comprises a solution of a hygroscopic desiccant, for example, of calcium chloride ($CaCl_2$), lithium chloride (LiCl), lithium bromide (LiBr), calcium chloride ($CaCl_2$), zinc chloride ($ZnCl_2$), magnesium sulfate ($MgSO_4$), sulfuric acid ($H_2SO_4$), sodium hydroxide (NaOH), ethylene glycol, propylene glycol, triethylene glycol, hexane, or toluene. In one example, the hygroscopic working fluid comprises a solution of the desiccant in a solvent, such as water. At a particular temperature, the solution of the hygroscopic working fluid is driven toward an equilibrium desiccant concentration via the evaporation of moisture from the working fluid or the absorption of ambient moisture, e.g., from surrounding gasses such as the process gas. The hygroscopic working fluid reduces moisture evaporation due to the rapid achievement and sustained maintenance of temperature and moisture equilibrium between the process gas and the hygroscopic working fluid. Once equilibrium is reached, the net moisture loss is essentially zero, as any moisture that evaporates from the hygroscopic working fluid into the process gas is reabsorbed from the process gas by the working fluid in order to maintain the equilibrium desiccant concentration.

The hygroscopic working fluid may be used as a supporting liquid for aqueous-phase conditioning of a process gas in industrial gas-conditioning operations, such as scrubbing, stripping, or purification of a process gas. The hygroscopic working fluid, particularly once it has reached equilibrium, provides advantages such as reduced water loss due to evaporation and reduced waste water formation.

Figure 1:
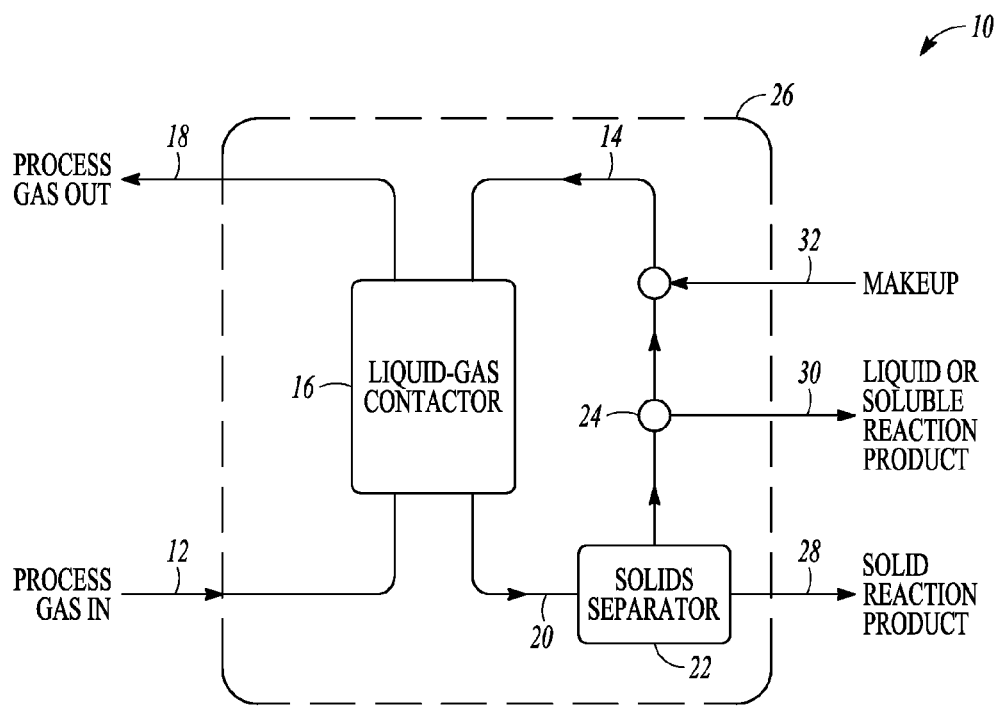
FIG. 1 is a schematic of an example liquid-gas conditioning system according to the present invention.

FIG. 1 shows a general flow diagram for an example system 10 using a hygroscopic working fluid comprising a solution of a desiccant for conditioning of a process gas. In system 10, gas conditioning of a process gas inlet stream 12 with a hygroscopic working fluid 14 is performed in a liquid-gas contactor 16. Working fluid 14 is contacted with process gas inlet stream 12 in order to enable a mass transfer of one or more constituents from process gas inlet stream 12 to working fluid 14. The mass transfer, which may comprise absorption of the constituent of process gas inlet stream 12 or reaction of the constituent of process gas inlet stream 12 with one or more constituents of working fluid 14 to form one or more reaction products, removes the one or more constituents from process gas inlet stream 12 so that a process gas outlet stream 18 contains a reduced amount of the constituent or so that the constituent is removed from process gas outlet stream 18.

Working fluid 14 comprises a solution of a desiccant in a solvent, such as water. Examples of desiccants that may be used, for example for contacting a flue gas, include inorganic salts, such as lithium chloride (LiCl), lithium bromide (LiBr), calcium chloride ($CaCl_2$), magnesium sulfate, and zinc chloride ($ZnCl_2$), to name a few, inorganic acids, such as sulfuric acid ($H_2SO_4$), or inorganic bases, such as sodium hydroxide (NaOH) or organic hygroscopic compounds, such as ethylene glycol, propylene glycol, triethylene glycol, hexane, toluene, and the like.

Working fluid 14 may also comprise a reagent that reacts with one or more constituents that are to be removed from process gas inlet stream 12. Preferred examples of reagents that may be included in working fluid 14 are calcium-based reagents, such as hydrated lime ($Ca(OH)_2$), limestone ($CaCO_3$), magnesium hydroxide, sodium carbonate or sodium bi-carbonate, which may be used to react with sulfur-containing compounds in flue gases, such as $SO_2$, or with other pollutants or contaminants in flue gasses, such as HCl.

The working fluid that exits liquid-gas contactor 16, referred to herein as spent working fluid 20, comprises the constituent removed from process gas inlet stream 12. The removed constituent is either absorbed by working fluid 14, 20 or the removed constituent reacts with a reagent within working fluid 14, 20 to form a reaction product or products that are carried along with spent working fluid 20. For the sake of brevity, both dissolved/absorbed constituents and a chemical reaction product formed by the chemical reaction of the constituent will be referred to herein as a "reaction product" within working fluid 14.

Examples of constituents that may be removed from process gas inlet stream 12 include undesirable constituents that may be harmful or undesirable to release into the atmosphere, such as pollutants, for example sulfur-containing compounds in a flue gas, such as sulfur dioxide ($SO_2$), sulfur trioxide ($SO_3$), hydrogen sulfide ($H_2S$), or other flue gas contaminants such as hydrogen chloride (HCl) or selenium dioxide ($SeO_2$).

In one example, shown in FIG. 1, spent working fluid 20 is recirculated back into liquid-gas contactor 16 as working fluid 14. In some examples, described in more detail below, spent working fluid 20 is treated by one or more separation operations 22, 24 to remove or purge reaction products that are formed in spent working fluid 20 due to their absorption or reaction from a constituent of process gas inlet stream 12. Separation operations 22, 24 maintain a material balance across process boundary 26 so that reaction products do not build up within recirculating working fluid 14, 20.

In one example, a separation operation may comprise a solid separator 22 for the removal of reaction products that are either solid or which may be precipitated from spent working fluid 20 as a solid reaction product 28. Examples of a solid separator 22 that may be used include a centrifuge, decanter, cyclone separator, filtration device, such as a vacuum filter, pressure filter, or microfiltration system, other applicable solid separation methods known in the art, and/or a reactor where a precipitation reaction is performed.

In another example, a separation operation may comprise a liquid separator 24 which provides for the removal of liquid or soluble reaction products 30 from working fluid 14, 20. Liquid separation using a separator 24 may be performed in addition to or instead of solid separation using solid separator 22. In one example, liquid separator 24 comprises a split in the flow of spent working fluid 20 in order to provide a liquid purge of a portion of the liquid or soluble reaction products within spent working fluid 20. In one example, liquid separator 24 splits off a percentage of spent working fluid 20 that is sufficient to remove approximately the same mass of liquid or soluble reaction products that are added to working fluid 14 within liquid-gas contactor 16, such as by splitting off from about 0.001% to about 1.0% of spent working fluid 20. Other types of liquid separators 24 may be used, such as a distillation column and other applicable liquid separation methods known in the art.

In some examples, spent working fluid 20 is replenished with a makeup working fluid 32 in order to replace any desiccant and/or water that may be removed in solid reaction product stream 28 or liquid or soluble reaction product stream 30. Makeup working fluid 32 may comprise at least one of a desiccant of working fluid 14, a reagent that will form the desiccant upon reaction with a constituent within working fluid 14 or process gas inlet stream 12, a solvent that forms working fluid 14, e.g., water, or a reagent that is used as part of the gas-conditioning reaction of process gas inlet stream 12 to react with a constituent of process gas inlet stream 12 that is to be removed, such as a hydrated lime ($Ca(OH)_2$) reagent that is used for removing $SO_2$ and HCl from a flue gas.

The composition of working fluid 14 may depend on the composition of process gas inlet stream 12 and the type of gas conditioning that is desired. One consideration in the formation of working fluid 14 is the desiccant or reagent that is selected. The choice of desiccant will have a significant effect on the performance of working fluid 14 because the particular desiccant will affect the moisture equilibrium properties, the operating temperature range, chemical reactivity with constituents in process gas inlet stream 12, and physical properties such as working fluid 14 viscosity and density.

An additional consideration regarding desiccant selection that may be considered is the method of providing makeup for the desiccant that leaves system 10 through solid reaction product stream 28 and liquid or soluble reaction product stream 30. In one example, the desiccant in working fluid 14 is selected to be an inherent reaction product in a reaction of the gas-conditioning process of process gas inlet stream 12 that occurs within liquid-gas contactor 16 so that the formation of the desiccant provides for at least a portion of the makeup of dessicant that leaves through reaction product stream 28 and/or 30. The term "inherent reaction product," as used herein, refers to a thermodynamically favored reaction product that is formed within working fluid 14, 20 by reaction between a constituent of process gas inlet stream 12 and a reagent within working fluid 14, 20. In such an example, the desiccant is added to working fluid 14, 20 by the operation of liquid-gas contactor 16, and the amount of the desiccant can be controlled by elimination of excess desiccant via solid discharge in solid reaction product stream 28 from solid separator 22 or via liquid or soluble reaction product stream 30 from liquid separator 24, e.g., liquid purge stream 30.

An example of a desiccant that is an inherent reaction product is calcium chloride ($CaCl_2$) in the scrubbing of HCl from a flue gas along with a calcium-based reagent for neutralization of the HCl, such as $Ca(OH)_2$. A $CaCl_2$ desiccant simplifies the scrubbing process's desiccant and chloride mass balance requirements because $CaCl_2$ can be withdrawn via a purge stream 30 in order to balance the creation of $CaCl_2$ due to HCl absorption.

In examples where the desiccant is not an inherent reaction product of the particular gas-conditioning operation being performed in liquid-gas contactor 16, the desiccant may be supplemented in other ways to make up for the desiccant that is removed via solid reaction product stream 28 and liquid or soluble reaction product stream 30. In some examples, the desiccant may be replenished via a makeup working fluid 32, which may comprise a direct addition of the desiccant that exited system 10 via solid reaction product stream 28 and/or liquid or soluble reaction product stream 30 or by the addition of a reagent that will react with another component in working fluid 14, 20 or a component of process gas inlet stream 12 in order to result in the desired desiccant.

Advantages of hygroscopic working fluid 14 within liquid-gas contactor 16 of system 10 include: a greatly reduced water makeup requirement compared to gas-conditioning process that use working fluids that are primarily water or water-based; a reduction in the amount of waste water that is produced by system 10 over primarily water or water-based working fluids; and decoupling of the operating temperature of liquid-gas contactor 16 from the corresponding saturation conditions of process gas inlet stream 12, which may allow the operating temperature to be selected to optimize the kinetics of the particular gas-conditioning process or to facilitate heat recovery from process gas inlet stream 12, 18.

The benefit of reducing water makeup requirements is achieved by reduced or eliminated evaporation of water in liquid-gas contactor 16 as well as reduced production of waste water. Water is typically lost from a gas-conditioning process in three primary ways: (1) as evaporated moisture carried away with the process gas outlet; (2) as a component of discharged liquid, such as within a liquid purge stream, a liquid or soluble reaction product stream, or a waste water stream; and (3) as water chemically and/or physically associated with discharged solid reaction product. Water loss in industrial processes can be of great concern during plant planning and operation, and in many areas, water consumption is becoming a limiting resource. Obtaining sufficient water rights for water consumption during plant operation delays plant permitting, limits site selection, and can create a highly visible vulnerability for opponents of new development.

Evaporation of water in a liquid-gas contactor is typically the single largest loss of water in gas-conditioning processes by far, particularly if the moisture content of the process gas inlet is substantially lower than the saturation condition at the operating temperature. The loss of moisture through evaporation is reduced or eliminated by using a hygroscopic working fluid 14 that is either at an equilibrium concentration for the desiccant or that can reach equilibrium with process gas inlet stream 12 relatively rapidly within liquid-gas contactor 16. Once the equilibrium concentration of the desiccant is achieved, the net amount of water evaporated within liquid-gas contactor 16 is essentially zero, eliminating the evaporation route of water loss while still maintaining the desired gas-conditioning functionality of liquid-gas contactor 16.

The benefit of reducing the amount of waste water produced by system 10 may be achieved because spent working fluid 20 is more concentrated with soluble species and has a lower water content than systems that use water or primarily water-based working fluids, as shown in the Examples below. For this reason, any spent working fluid 20 that exits system 10 via either solid reaction product stream 28 or liquid or soluble reaction product stream 30 can release more soluble species and less water per volume of exiting working fluid 20 than a more dilute water or primarily water-based working fluid. In examples where the desiccant is an inherent reaction product of the constituent being removed from process gas inlet stream 12, a particularly concentrated and reduced flow rate of liquid or soluble reaction product stream 30 may be achieved compared to water or primarily water-based systems due to the fact that the desiccant (which is also the reaction product needing removal) will be present in relatively high concentrations to achieve the desired equilibrium moisture properties. For example, a $CaCl_2$-based dessicant may be present in concentrations as high as 30-45% by mass within liquid or soluble reaction product stream 30.

The reduction in waste water production has two advantages. First, because the removal of waste water is one of the three primary methods of water loss from a gas-conditioning system, as noted above, a reduction on the total amount of waste water produced results in a further reduction in water loss from system 10. Typically, the loss of water to waste water is the second most significant loss of water from a gas-conditioning system, so this reduction in waste water production may have a significant effect on water loss. Second, the reduction in waste water production leads to a reduction in the volume of liquid that requires further treatment or disposal because the waste water that is produced has a smaller volume than waste water produced in water or primarily water-based systems and has a higher concentration of reaction products within the liquid or soluble reaction product stream 30.

The benefit of system 10 decoupling the operating temperature of liquid-gas contactor 16 from the corresponding working fluid 14/process gas inlet stream 12 saturation conditions, may be achieved because working fluid 14 may be made to approach a desired temperature and moisture equilibrium with process gas inlet stream 12 by modifying the desiccant concentration within working fluid 14. In contrast, for water or primarily water-based working-fluid systems, moisture evaporates until equilibrium conditions with process gas inlet stream 12 or saturation of process gas inlet stream 12 are reached, resulting in quenching that cools the process gas inlet stream 12 to saturation or near saturation temperatures (e.g., the dew point of process gas inlet stream 12). Thus, in these conventional water or primarily water-based systems, the operating temperature of liquid-gas contactor 16 is practically limited by the saturation temperature of process gas inlet stream 12.

In system 10, the operating temperature of liquid-gas contactor 16 may be selected independently of saturation conditions of process gas inlet stream 12. Moreover, the desiccant concentration in working fluid 14, 18 will adjust to match the temperature and moisture content of process gas 12, 18. This phenomenon allows the operating temperature of liquid-gas contactor 16 to be selected, within the effective temperature range of the desiccant, and controlled by regulating thermal energy transfer to or from working fluid 14, 20 or the process gas 12, 18. Selection and control of the operating temperature can improve or optimize the kinetics of the gas-conditioning process. Alternatively, selection and control of the working temperature of liquid-gas contactor 16 can facilitate heat recovery from process gas outlet stream 18.

In some examples, the operating temperature of liquid-gas contactor 16 may be selected to be greater than the corresponding saturation temperature (e.g., dew point) of process gas 12, 18. Operating above the process gas dew point may provide advantages in terms of optimizing kinetics of the gas-conditioning reactions or operations, preventing uncontrolled precipitation of reaction products, or facilitating the recovery of thermal energy from process gas 12, 18. High operating temperatures may also allow for preserving of exhaust plume buoyancy. Operating at high temperatures may also reduce or prevent condensation-dependent transport of contaminants through liquid-gas contactor 16, e.g., as with sulfuric acid ($H_2SO_4$) mist formation in flue gas desulfurization systems such as in a power plant.

Figure 2:
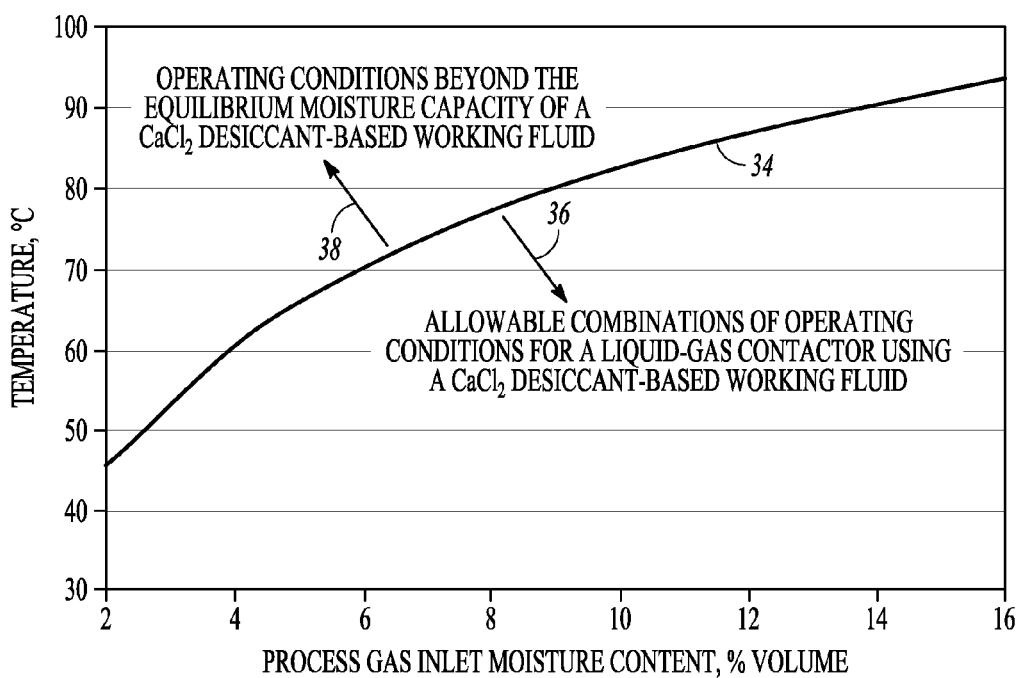
FIG. 2 is a graph showing an example operating temperature boundary for an example scrubbing system comprising a $CaCl_2$-based hygroscopic working fluid.

Although operating at higher temperatures may be advantageous, there are bounds to the operating temperature that may be used in liquid-gas contactor 16 due to limitations of hygroscopic working fluid 14. Candidate working fluids 14, and in particular the desiccant within a particular working fluid 14, tend to have an inherent boundary temperature and moisture level above which working fluid 14 is no longer capable of retaining sufficient moisture to remain as a liquid. FIG. 2 shows an example curve of an operating temperature boundary 34 for a working fluid 14, in this case a $CaCl_2$-based working fluid, as a function of the moisture content of process gas inlet stream 12. When the operating temperature of liquid-gas contactor 16 and the moisture content of process gas inlet stream 12 are below boundary 34, represented by arrow 36 in FIG. 2, then working fluid 14 may be used for the gas-conditioning process in liquid-gas contactor 16. When the operating temperature of liquid-gas contactor 16 and the moisture content of process gas inlet stream 12 are above boundary 34, represented by arrow 38 in FIG. 2, the desiccant will tend to either crystallize or no longer support the aqueous-phase reactions or absorptions of the gas-conditioning process.

In processes where the conditions within liquid-gas contactor 16 will fall above the acceptable range of operating conditions for working fluid 14 and liquid-gas contactor 16, some form of cooling of process gas inlet stream 12 may be employed. FIGS. 3-6 show several example configurations that may be used to cool process gas inlet stream 12 before feeding it into liquid-gas contactor 16.

Figure 3:
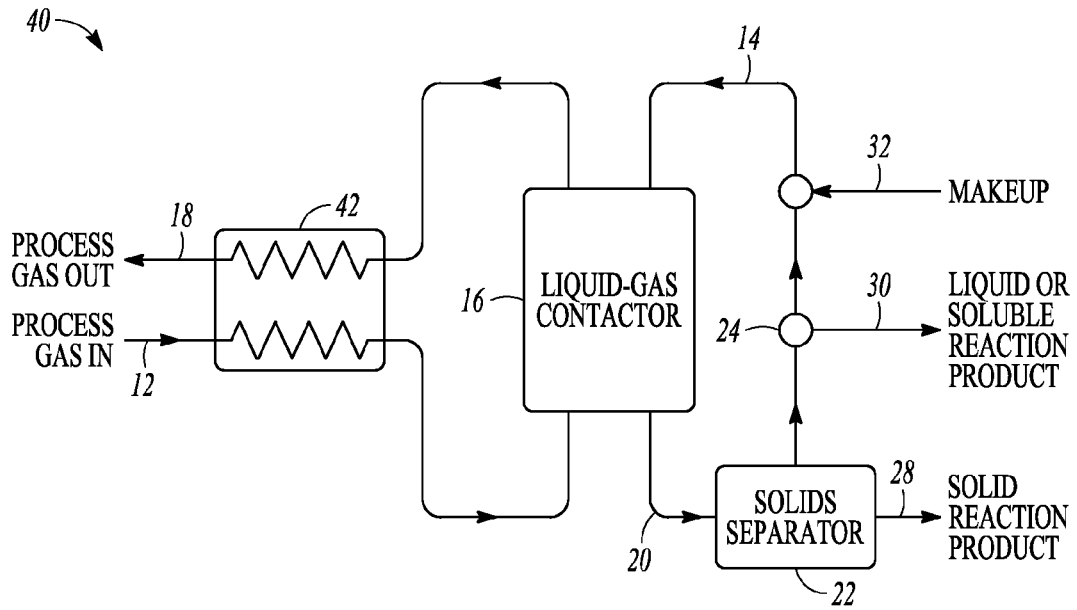
FIG. 3 is a schematic of another example liquid-gas conditioning system according to the present invention comprising an example of a configuration for management of the operating temperature of a liquid-gas contactor comprising a regenerative heat exchanger for managing an inlet temperature of the process gas into the liquid-gas contactor.

FIG. 3 shows a system 40 that is similar to the generalized system 10 of FIG. 1 with the addition of a regenerative heat exchanger 42 for managing the temperature of process gas inlet stream 12, which in turn manages the operating temperature within liquid-gas contactor 16. Regenerative heat exchanger 42 uses the cooler process gas outlet stream 18 to cool the hot process gas inlet stream 12, for example by cooling process gas inlet stream 12 to a temperature below boundary 34 (FIG. 2) so that working fluid 14 will be effective in the gas-conditioning operation of liquid-gas contactor 16. A regenerative heat exchanger 42 transfers heat across liquid-gas contactor 16, which may be a thermodynamically efficient method of achieving cooling of process gas inlet 12.

Figure 4:
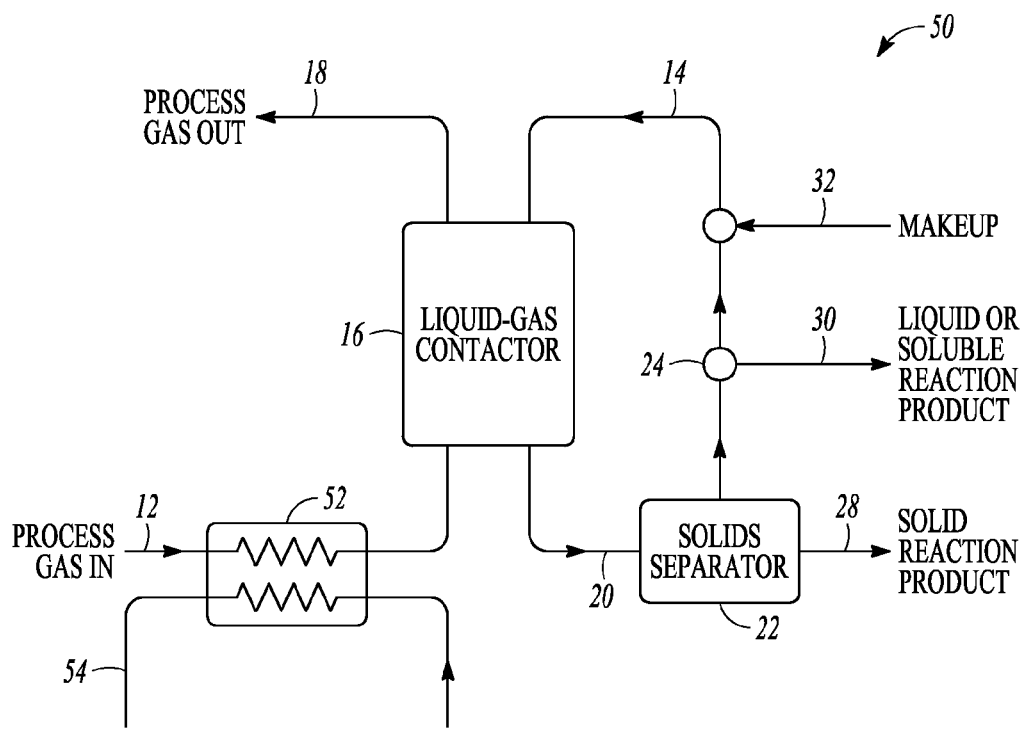
FIG. 4 is a schematic of another example liquid-gas conditioning system according to the present invention comprising another example of a configuration for management of the liquid-gas contactor operating temperature comprising a recovery heat exchanger for managing an inlet temperature of the process gas into the liquid-gas contactor.

FIG. 4 shows another system 50 that includes a heat exchanger 52 for managing the temperature of process gas inlet stream 12, which in turn, manages the operating temperature within liquid-gas contactor 16. Like heat exchanger 42 of system 40 in FIG. 3, heat exchanger 52 cools the hot process gas inlet stream 12. Heat exchanger 52 cools process gas inlet stream 12 by transferring heat from process gas inlet stream 12 to a cooling fluid 54. Cooling fluid 54 may, for example, be a cooling water or a process stream from another part of the plant. In cases where a process stream is used as cooling fluid 54, heat exchanger 52 may be referred to as a recovery heat exchanger, because heat exchanger 52 is used to recover heat from process gas inlet stream 12 that would otherwise be lost due to venting of process gas outlet stream 18 and use it to heat the process stream fluid 54.

Figure 5:
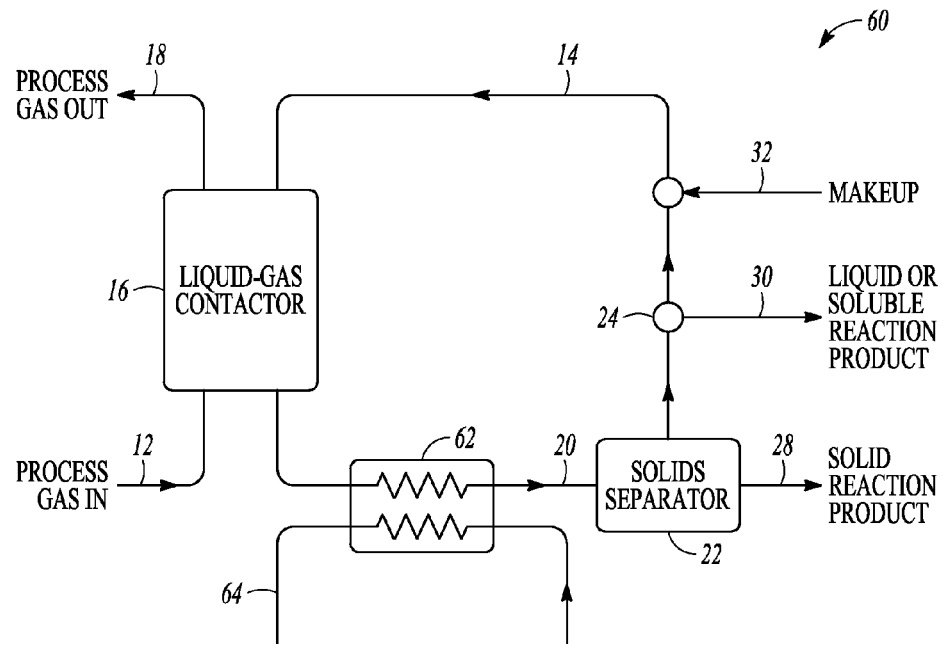
FIG. 5 is a schematic of another example liquid-gas conditioning system according to the present invention comprising another example of a configuration for management of the liquid-gas contactor operating temperature at a liquid-gas contactor comprising a heat-exchanger for managing the temperature of the working fluid.

FIG. 5 shows yet another system 60 that includes a heat exchanger 62 for managing the temperature of working fluid 14, 20, which in turn, manages the operating temperature within liquid-gas contactor 16. Heat exchanger 62 cools working fluid 14, 20 by transferring heat to a cooling fluid 64. Heat exchanger 62 may be configured to cool spent working fluid 20 after exiting liquid-gas contactor 16, as shown in FIG. 5, or heat exchanger 62 may be configured to cool working fluid 14 before entering liquid-gas contactor 16 (not shown). Cooling fluid 64 may, for example, be cooling water or a process stream from another part of the plant.

Figure 6:
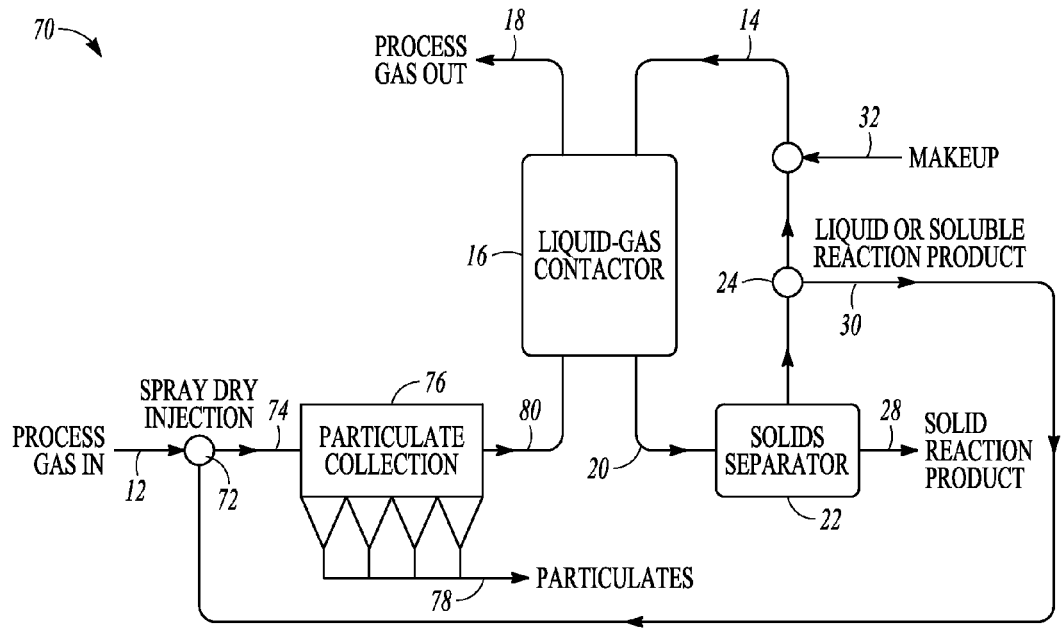
FIG. 6 is a schematic of another example liquid-gas conditioning system according to the present invention comprising another example of a configuration for management of the liquid-gas contactor operating temperature comprising spray drying a liquid reaction product stream in order to manage the inlet temperature of the process gas into the liquid-gas contactor.

FIG. 6 shows another example system 70 for managing the operating temperature within liquid-gas contactor 16. In the example system 70 shown in FIG. 6, the operating temperature of liquid-gas contactor 16 is maintained by cooling process gas inlet stream 12 by spray-drying at least a portion of a liquid purge stream 30 into process gas inlet stream 12, for example using one or more spray-dry injection nozzles 72. Spraying liquid purge stream 30 into process gas inlet stream 12 causes liquid components within purge stream 30 to vaporize, which in turn cools process gas inlet stream 12 and creates a mixture 74 comprising the process gas and dried solid particles, which either existed in liquid purge stream 30 as fine particulates that were not removed by solid separator 22 or precipitated out of liquid purge stream 30 as liquid vaporized and concentrations of components increased above a saturation concentration. Mixture 74 may be fed through a particulate collection apparatus 76, such as a particulate cyclone, a particulate scrubber, e.g., cyclonic spray scrubber and wet scrubber, a baghouse, an electrostatic precipitator, and the like. Particulate collection apparatus 76 separates solid particulates 78 from a cooled process gas inlet stream 80, which is fed into liquid-gas contactor 16.

EXAMPLES

The following examples are provided in order to demonstrate and further illustrate certain embodiments and aspects of the present disclosure and are not to be construed as limiting the scope thereof.

Desulfurization of coal combustion flue gas, or flue gas desulfurization (FGD), is used in the present Example to demonstrate aspects and advantages of the processes described above. FGD was selected because it is a common industrial gas-conditioning process that is under frequent scrutiny to reduce water consumption and waste water treatment.

Example 1

The process of Example 1 uses a hygroscopic working fluid to achieve equilibrium moisture flue gas desulfurization (EM-FGD). The hygroscopic working fluid comprises $CaCl_2$ as a desiccant in a solution of water. A calcium-based reagent of hydrated lime ($Ca(OH)_2$) is also included.

Comparative Example 2

Comparative Example 2 comprises a conventional FGD process using a water-based working fluid as a control. The water-based working fluid of Comparative Example 2 comprises a majority of water, with a calcium-based reagent of hydrated lime ($Ca(OH)_2$).

Process Diagram

Figure 7:
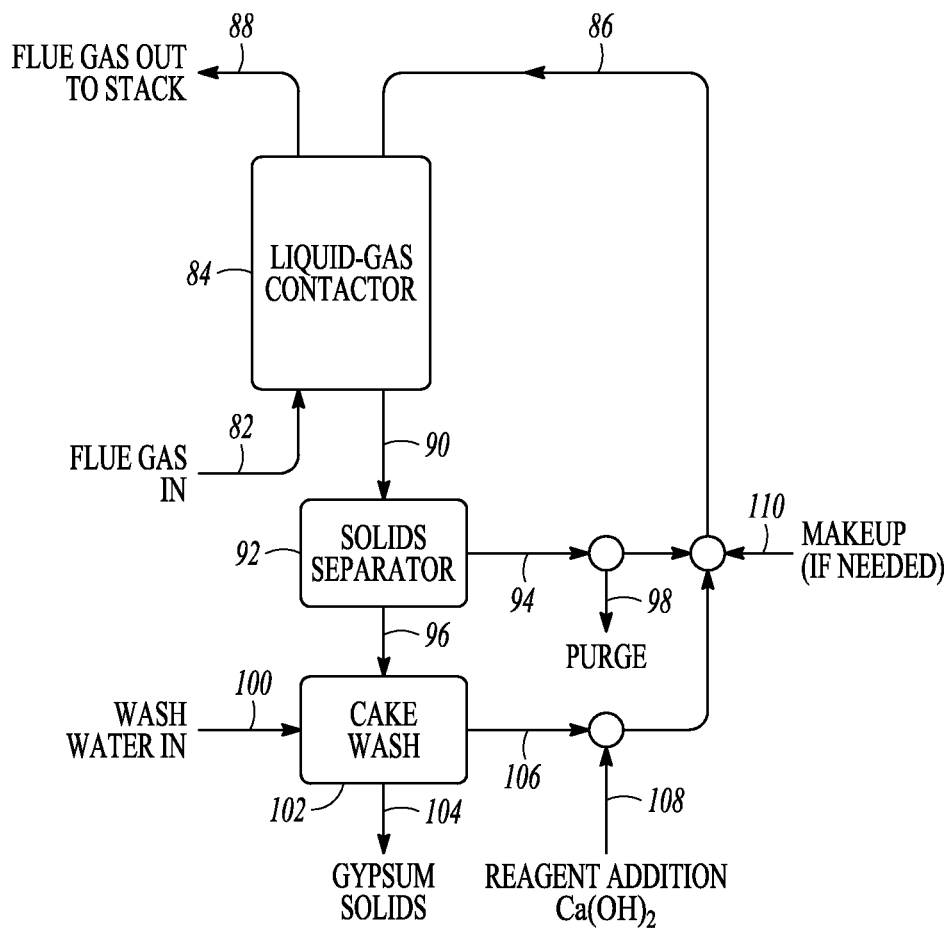
FIG. 7 is a schematic of a gas-conditioning system of the Examples for flue gas desulfurization using a liquid-gas contactor.

FIG. 7 shows the general schematic of the system for both the EM-FGD process of Example 1 and the conventional FGD process of Comparative Example 2. A flue gas 82 from a coal combustion operation, such as in a coal combustion power plant, is fed into a liquid-gas contactor 84 along with a working fluid 86. The working fluid removes sulfur dioxide ($SO_2$) and hydrogen chloride gas (HCl) from flue gas 82 to provide a conditioned flue gas 88 that may be released out of a stack. The $SO_2$ and HCl are absorbed and/or react with working fluid 86 to form a spent working fluid 90.

Spent working fluid 90 is sent through a solid separator 92 to separate liquid or soluble reaction product 94 from solid or precipitated reaction product 96. A liquid purge stream 98 is split off from liquid or soluble reaction product 94 to purge chloride in order to balance the absorption of HCl from flue gas 82.

Solid reaction product 96 may be washed with wash water 98 in a cake wash 102 in order to remove any liquid or soluble reaction product that may be chemically or physically associated with solid reaction product 96 to provide a washed solid reaction product 104, such as a gypsum solid (e.g., $CaSO_4.2H_2O$) formed by reaction of $SO_2$ with the calcium-based reagent. A wash outlet 106 exits cake wash 102 and includes a mixture of wash water 100 and any soluble or liquid reaction products that were washed off solid reaction product 96. Wash outlet 196 is mixed back in with any unpurged liquid reaction product 94 and recirculated back to liquid-gas contactor 84 as working fluid 86. The system also includes a makeup reagent stream 108 where the calcium-based reagent (e.g., $Ca(OH)_2$) is added to make up for any reaction with constituents of flue gas 82 in liquid-gas contactor 84. A makeup working fluid stream 110 may also be provided to make up for water and/or desiccant that is lost via evaporation, reaction, or out through liquid purge 98, if needed.

The operating conditions and assumptions for the power plant processes of Example 1 and Comparative Example 2 are presented in Table 1, below. The inlet temperature of flue gas 82 is 70° C., which is considerably lower than the flue gas temperature of about 150° C. that is typically encountered in power plants in the United States. However, for Example 1 and Comparative Example 2, flue gas 82 was cooled to a temperature that is within the operating range of the $CaCl_2$ desiccant.

TABLE 1

FGD Application Conditions and Common Calculation Assumptions

| | |
|---|---|
| Nominal Plant Size | 500 MW |
| Flue Gas Inlet Conditions | |
| Temp: | 70° C. (with precooling) |
| Mass flow rate: | 2,420,000 kg/hr dry |
| Moisture: | 9% vol. moisture (135,000 kg/hr $H_2O$) |
| $SO_2$ content: | 2600 ppmv $SO_2$, (14,100 kg/hr $SO_2$) |
| HCl content: | 60 ppmv HCl (196 kg/hr HCl) |
| $SO_2$ Capture Efficiency | 95% |
| HCl Capture Efficiency | 100% |
| Solids Precipitation | Forced oxidation, 90% solids content in the separated and washed gypsum cake |

The primary difference between the EM-FGD process of Example 1 and the conventional wet FGD process of Comparative Example 2 is in the composition of working fluid 86 that enters liquid-gas contactor 84. Table 2 shows the slurry composition of a working fluid in a conventional FGD (Comparative Example 2) contrasted with the slurry composition of a working fluid in the EM-FGD process (Example 1).

TABLE 2

Working Fluid Comparison

| | EM-FGD (Example 1) | Conventional FGD (Comparative Example 2) |
|---|---|---|
| $H_2O$ Content, mass % | 47.6 | 88.8 |
| Chloride Level, mass % | 29.4 (as $CaCl_2$) | 1.4 (15,000 ppm) |
| $Ca(OH)_2$ Reagent Loading, mass % | 6.4 | 9.1 |

The substantially higher chloride level in the EM-FGD working fluid of Example 1 is primarily present as $CaCl_2$ desiccant. The $CaCl_2$ desiccant maintains the water content of the working fluid 86 when in contact with flue gas 82 at the conditions in Table 1. The differences in the $Ca(OH)_2$ reagent loading are due to the fact that the EM-FGD working fluid of Example 1 is more dense than the conventional working fluid of Comparative Example 2. The reagent loading is consistent between the two Examples on a volume basis.

Water balance calculations for Example 1 and Comparative Example 2 after the gas-conditioning process shown in FIG. 7 has reached steady state are provided in Table 3.

TABLE 3

Water Balance Comparison ($H_2O$ kg/hour)

| Stream | EM-FGD (Example 1) | Conventional FGD (Comparative Example 2) |
|---|---|---|
| Flue Gas Inlet (82) | 135,400 | 135,400 |
| Flue Gas Outlet (88) | 135,700 | 146,600 |
| Wash Water Inlet (100) | 3690 | 3690 |
| Gypsum Cake Outlet (104) | 3080 | 3080 |
| Liquid Purge Outlet (98) | 310 | 12,540 |
| Makeup Water Inlet (110) | 0 | 23,160 |
| Total Water Supply to FGD (cake wash + makeup) | 3690 | 26,850 |
| Liquid Purge volume flow | 0.21 m³/hr | 13 m³/hr |

As shown in Table 3, in the conventional FGD system (Comparative Example 2), approximately 42% of the total water supply is lost via evaporation between flue gas inlet 82 and flue gas outlet 88. Moreover, this 42% is actually lower than is typical for conventional FGD processes, which are typically more than 80% of the total water supply to a FGD system. This lower evaporative loss in the conventional FGD of Comparative Example 2 is believed to be due to the pre-cooling of flue gas 82 to 70° C.

Even with the lower-than-typical value in Comparative Example 2, the water loss due to evaporation in the EM-FGD process of Example 1 is still substantially lower, with only about 8.1% of the total water supply lost to evaporation in Example 1. Moreover, as shown in Table 3, the total mass of water lost to evaporation is about 2.7% of the total mass lost in the conventional FGD process (e.g., 300 kg/hour for the EM-FGD process of Example 1 vs. 11,200 kg/hr for the conventional FGD process of Comparative Example 2). As is further shown in Table 3, the EM-FGD process of Example 1 allows for the elimination of makeup water in makeup working fluid stream 110 because the water provided in wash water stream 100 is sufficient to make up for the water lost via evaporation in liquid-gas contactor 84 and via liquid purge 98.

Table 3 shows a reduction in waste water produced in liquid purge 98. As shown in Table 3, the EM-FGD process of Example 1 results in a 97.5% reduction in the mass of waste water in liquid purge 98 compared to the waste water produced in the conventional FGD process of Comparative Example 2 (from 12,540 kg/hour for Comparative Example 2 to 310 kg/hour for Example 1). The EM-FGD process of Example 1 also results in a 98.4% reduction in the volume of waste water purged in liquid purge 98 compared to the waste water produced in the conventional FGD process of Comparative Example 2 (from 13 m³/hour for Comparative Example 2 to 0.21 m³/hour for Example 1).

The reduction in waste water flow in liquid purge 98 can be attributed to a higher concentration of chlorides in liquid or soluble reaction product stream 94 for the EM-FGD process of Example 1 compared to that of the conventional FGD process of Comparative Example 2. Because of this higher concentration of chlorides, there is less purge flow in liquid purge 98 in order to balance the chlorides that are removed from flue gas 82 in liquid-gas contactor 84. The reduced waste water production may reduce water consumption, as discussed above, but also reduces the waste water treatment burden on the EM-FGD process of Example 1 compared to the conventional FGD process of Comparative Example 2. The waste water treatment burden of the EM-FGD process is reduced because the concentration of soluble contaminants, such as selenium, mercury, bromine, etc., is more concentrated in the water of liquid purge 98 and is confined to a smaller stream compared to a conventional FGD process of Comparative Example 2.

The concentrated nature of the liquid purge 98 of the EM-FGD process of Example 1 is also compatible with a number of zero liquid discharge options. For example, liquid purge 98 may be spray dried so that solid particles of contaminants may be collected in the plant's solid particulate control apparatus. The contaminants in the liquid purge 98 could also be crystallized in an evaporator, or could be disposed via deep well injection of the concentrated liquid purge 98.

In one example, the combined effect of the lower evaporative moisture loss and the lower waste water production of the EM-FGD process of Example 1 compared to the conventional FGD process of Comparative Example 2 results in a combined reduction in water supply of about 86.3% (from 26,850 kg/hour for Comparative Example 2 to 3690 for Example 1).

The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although examples of the present invention have been specifically disclosed, modification and variation of the concepts herein disclosed can be resorted to by those skilled in the art, and that such modifications and variations are considered to be within the scope of this invention as defined by the appended claims.

What is claimed is:

1. A method for treating a process gas with a liquid, the method comprising:
    contacting a process gas with a hygroscopic working fluid including a component adapted to absorb or react with a pollutant or contaminant in the process gas; and
    managing the working fluid or the process gas so that the working fluid and the process gas are in moisture equilibrium while contacting the process gas with the working fluid.

2. The method according to claim 1, wherein the working fluid includes a desiccant comprising at least one of lithium chloride (LiCl), lithium bromide (LiBr), calcium chloride ($CaCl_2$), magnesium sulfate ($MgSO_4$), zinc chloride ($ZnCl_2$), sulfuric acid ($H_2SO_4$), sodium hydroxide (NaOH), ethylene glycol, propylene glycol, triethylene glycol, hexane, or toluene.

3. The method according to claim 1, wherein the working fluid includes a desiccant comprising an inherent reaction product of a reaction between the pollutant or contaminant and the component.

4. The method according to claim 1, further comprising separating a reaction product from the working fluid after contacting the process gas with the working fluid, wherein the reaction product comprises at least one of the pollutant or contaminant absorbed into the working fluid or a product of a reaction between the pollutant or contaminant and the component of the working fluid.

5. The method according to claim 4, wherein separating the reaction product from the working fluid comprises at least one of separating a solid reaction product from the working fluid or separating a liquid or soluble reaction product from the working fluid.

6. The method according to claim 4, wherein separating liquid or soluble reaction product from the working fluid comprises using a liquid separation operation to separate the liquid or soluble reaction product from the working fluid or purging a portion of the working fluid.

7. The method according to claim 4, further comprising adding a makeup liquid to the working fluid after separating the reaction product from the working fluid, wherein the makeup liquid comprises at least one of a desiccant, a first reagent for a reaction to form a desiccant, a solvent, and a second reagent for a reaction with the pollutant or contaminant.

8. The method according to claim 1, further comprising at least one of managing the temperature of the process gas and managing the temperature of the working fluid while contacting the process gas and the working fluid.

9. A method for treating a process gas with a liquid, the method comprising:
    contacting a process gas with a hygroscopic working fluid in a liquid-gas contactor to remove a pollutant or contaminant from the process gas, the working fluid comprising a desiccant and a component adapted to absorb or react with the pollutant or contaminant;
    managing the working fluid or the process gas so that the working fluid and the process gas are in moisture equilibrium and temperature equilibrium while contacting the process gas with the working fluid;

separating a reaction product from the working fluid after contacting the process gas with the hygroscopic working fluid, wherein the reaction product comprises at least one of the pollutant or contaminant absorbed into the component of the working fluid or a product of a reaction between the pollutant or contaminant and the component of the working fluid; and recirculating the working fluid to the liquid-gas contactor after separating the reaction product from the working fluid.

10. The method according to claim 9, further comprising adding a makeup fluid to the working fluid after separating the reaction product from the working fluid and before recirculating the working fluid back to the liquid-gas contactor, the makeup fluid comprising at least one of makeup water or makeup reagent.

11. A system for treating a process gas, the system comprising:

a hygroscopic working fluid comprising a component adapted to absorb or react with a pollutant or contaminant in a process gas; and a liquid-gas contactor for contacting the working fluid and the process gas;

wherein the liquid-gas contactor is configured so that the working fluid and the process gas are in moisture equilibrium; and wherein the pollutant or contaminant is removed from the process gas within the liquid-gas contactor.

12. The system according to claim 11, wherein the working fluid comprises at least one of lithium chloride (LiCl), lithium bromide (LiBr), calcium chloride ($CaCl_2$), magnesium sulfate ($MgSO_4$), zinc chloride ($ZnCl_2$), sulfuric acid ($H_2SO_4$), sodium hydroxide (NaOH), ethylene glycol, propylene glycol, triethylene glycol, hexane, or toluene.

13. The system according to claim 11, wherein the working fluid comprises an inherent reaction product of a reaction between the pollutant or contaminant and the component of the working fluid.

14. The system according to claim 11, further comprising a separator for separating a reaction product from the working fluid, wherein the working fluid flows from the liquid-gas contactor to the separator, and wherein the reaction product comprises at least one of the pollutant or contaminant absorbed into the working fluid or a product of a reaction between the pollutant or contaminant and the component of the working fluid.

15. The system according to claim 14, wherein the separator comprises at least one of a solid separator and a liquid separator.

16. The system according to claim 11, further comprising a makeup fluid added to the working fluid after the working fluid leaves the liquid-gas contactor, wherein the makeup liquid comprises at least one of a desiccant, a first reagent for a reaction to form a desiccant, a solvent, and a second reagent for a reaction with the pollutant or contaminant.

17. The system according to claim 11, further comprising at least one of a heat exchanger for managing the temperature of the process gas or a heat exchanger for managing the temperature of the working fluid.

18. The system according to claim 11, further comprising a liquid spray dryer for spraying a liquid into the process gas in order to cool the process gas, wherein the process gas flows from the spray dryer to the liquid-gas contactor.

19. The method according to claim 1, wherein the working fluid includes a desiccant, and wherein managing the working fluid comprises selecting a concentration of the desiccant within the working fluid that is substantially equal to a moisture equilibrium concentration.

20. The system according to claim 11, wherein the working fluid includes a desiccant with concentration of the desiccant within the working fluid that is substantially equal to a moisture equilibrium concentration.

21. The method according to claim 1, wherein managing the working fluid or the process gas comprises managing the working fluid or the process gas so that the working fluid and the process gas are in moisture equilibrium and temperature equilibrium while contacting the process gas with the working fluid.

22. The system according to claim 11, wherein the liquid-gas contactor is configured so that the working fluid and the process gas are in moisture equilibrium and temperature equilibrium.

* * * * *

UNITED STATES PATENT AND TRADEMARK OFFICE
CERTIFICATE OF CORRECTION

PATENT NO. : 8,628,603 B2  Page 1 of 1
APPLICATION NO. : 13/241624
DATED : January 14, 2014
INVENTOR(S) : Martin et al.

It is certified that error appears in the above-identified patent and that said Letters Patent is hereby corrected as shown below:

On the title page, item (73), in "Assignee", in column 1, line 1, delete "Enviromental" and insert --Environmental--, therefor Signed and Sealed this
Sixth Day of January, 2015

Michelle K. Lee
*Deputy Director of the United States Patent and Trademark Office*